M. SCHAEFER.
PEELING MACHINE.
APPLICATION FILED FEB. 13, 1919.
1,378,058.
Patented May 17, 1921.
2 SHEETS—SHEET 1.
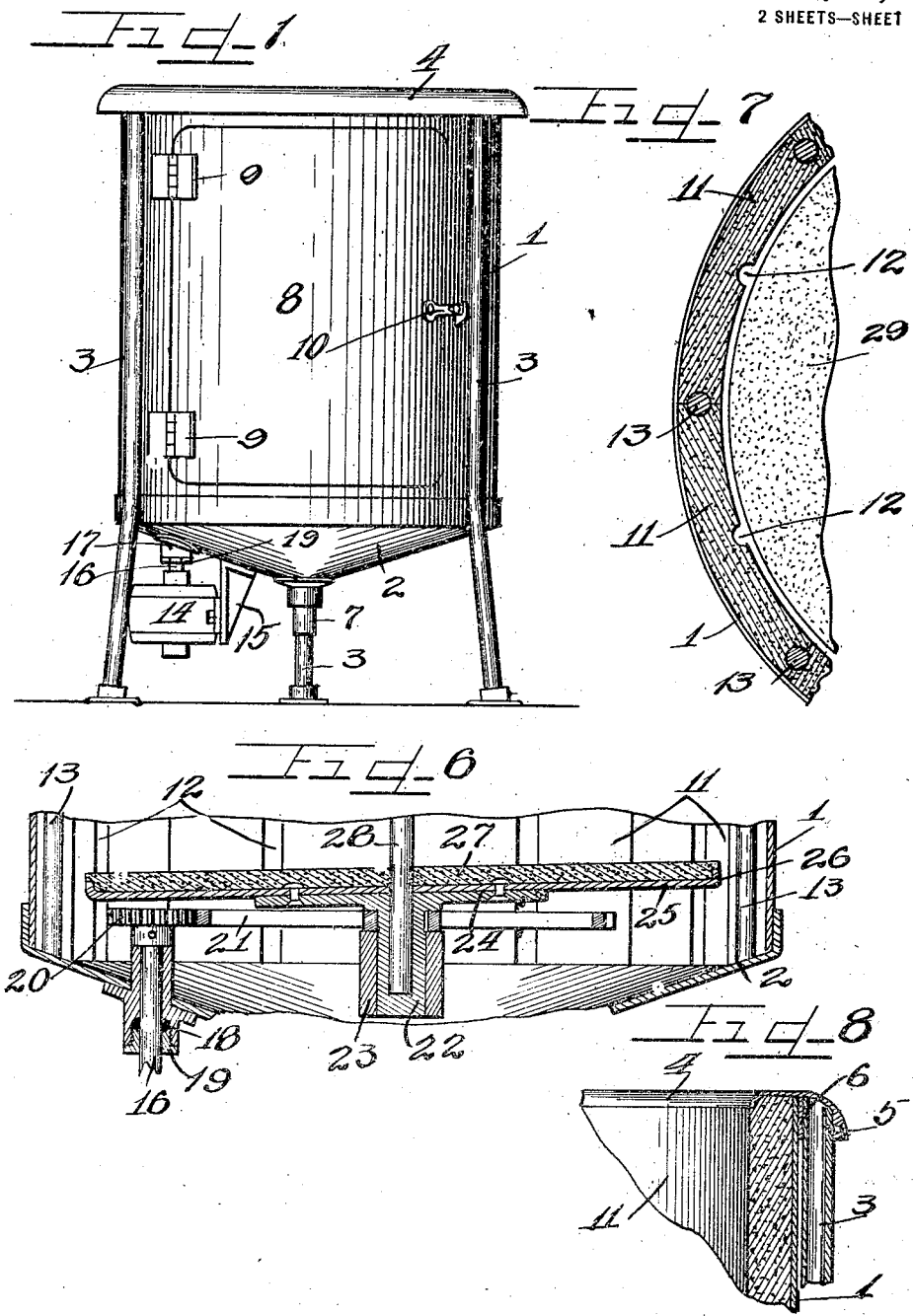

F. M. SCHAEFER.
PEELING MACHINE.
APPLICATION FILED FEB. 13, 1919.
1,378,058.
Patented May 17, 1921.
2 SHEETS—SHEET 2.
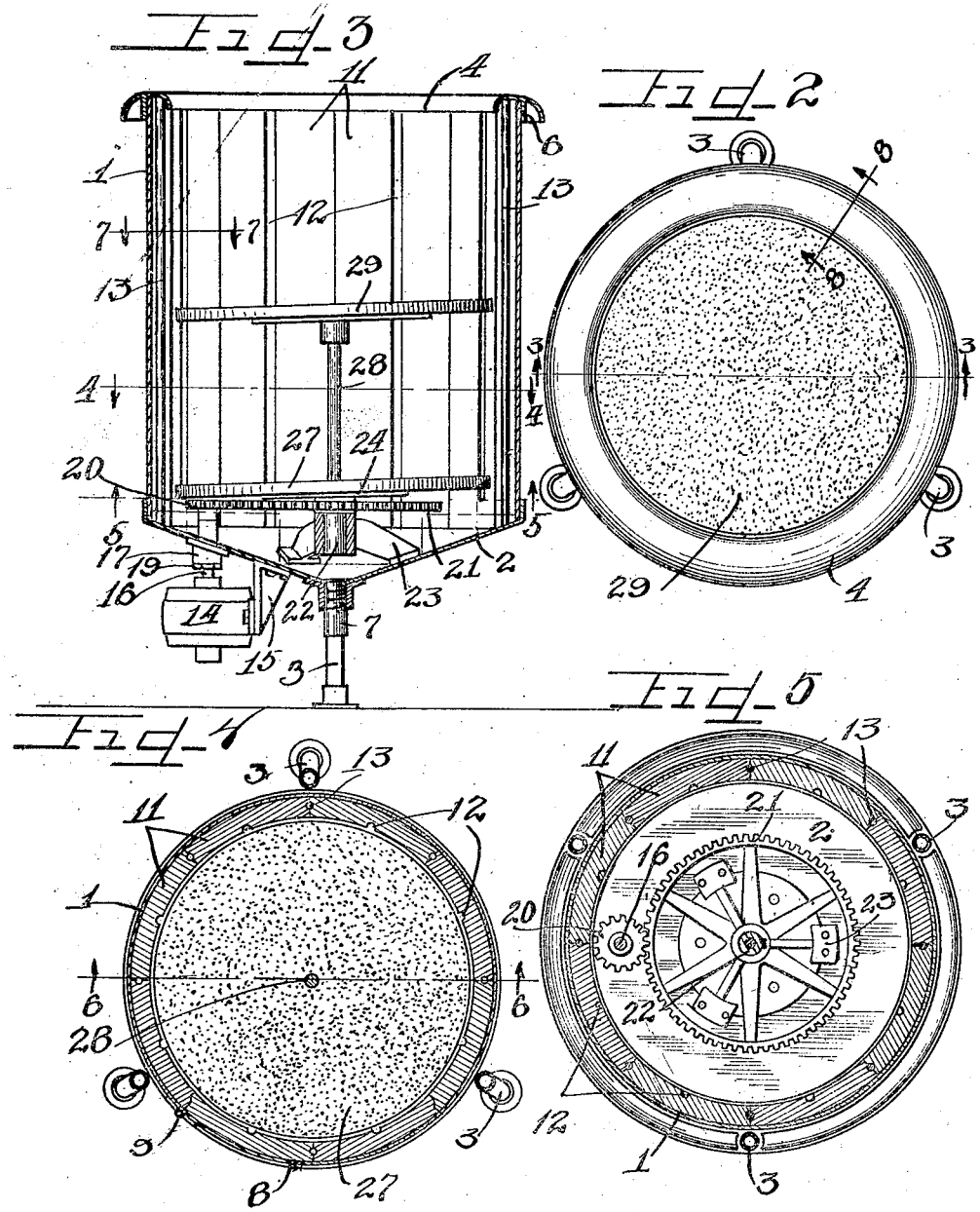

UNITED STATES PATENT OFFICE.

FRANK M. SCHAEFER, OF CHICAGO, ILLINOIS.

PEELING-MACHINE.

1,378,058.　　　　　Specification of Letters Patent.　　Patented May 17, 1921.

Application filed February 13, 1919. Serial No. 276,759.

*To all whom it may concern:*

Be it known that I, FRANK M. SCHAEFER, a citizen of the United States, and a resident of the city of Chicago, in the county of Cook and State of Illinois, have invented certain new and useful Improvements in a Peeling-Machine; and I do hereby declare that the following is a full, clear, and exact description of the same, reference being had to the accompanying drawings, and to the numerals of reference marked thereon, which form a part of this specification.

This invention pertains to an improved type of a vegetable and fruit peeler wherein a casing is equipped with an abrasive lining made of removable sections which coöperate with rotatable inclined abrasive disks one of which is removable to permit a double charge of vegetables or fruits to be carried by the peeler and simultaneously peeled by the abrasive lining and disks when said disks which are operated from below are rotated.

It is an object of this invention to provide an improved peeling machine adapted to peel one or a plurality of charges of vegetables at one time.

It is also an object of the invention to construct a peeling machine with removable abrasive lining sections.

Another object of the invention is the construction of a vegetable peeling machine wherein the rotating abrasive disks are inclined with respect to the vertical driving shaft.

A further object of the invention is to provide a peeling machine having a rotatable inclined abrasive disk adapted to removably receive a second inclined abrasive disk mounted thereabove to permit two charges of vegetables to be peeled at one time.

It is furthermore an object of this invention to construct a vegetable peeler adapted to drive inclined abrading disks from below, and further arranged with a central refuse drain in the bottom of the peeler.

It is also an object of the invention to provide a vegetable peeler the casing of which is adapted to be equipped with either one or a plurality of rotatable inclined abrasive disks which when rotated co-act with an abrasive casing lining made of removable sections, said disks and lining serving to peel vegetables after which the peeled vegetables are permitted to be discharged through a door provided for the purpose in said casing.

It is an important object of this invention to construct a vegetable peeling machine wherein a power driven inclined abrasive disk co-acts with an abrasive casing lining which is so constructed that sections thereof may be independently replaced when damaged or worn.

Other and further important objects of this invention will be apparent from the disclosures in the specification and drawings.

The invention (in a preferred form) is illustrated in the drawings and hereinafter more fully described.

On the drawings:

Figure 1 is a front elevation of a peeling machine embracing the principles of this invention.

Fig. 2 is a top plan view thereof.

Fig. 3 is a central vertical section taken on line 3—3, of Fig. 2, showing parts in elevation.

Fig. 4 is a section taken on line 4—4, of Fig. 3.

Fig. 5 is a section taken on line 5—5, of Fig. 3.

Fig. 6 is an enlarged fragmentary detail section taken on line 6—6, of Fig. 4, with parts in elevation.

Fig. 7 is an enlarged fragmentary detail section taken on line 7—7, of Fig. 3.

Fig. 8 is an enlarged fragmentary detail section taken on line 8—8, of Fig. 2.

As shown on the drawings:

The reference numeral 1, indicates a receptacle, tank or casing open at the top and provided with a conical or funnel shaped bottom 2. The casing 1, is supported by the pipe legs on supports 3, which project upwardly on the outside of the casing, and have the upper ends thereof engaged underneath the outer margin of the top ring 4, and secured thereto by screws 5, or other suitable means. The top ring 4, is rigidly but removably secured upon the upper open end of the casing 1, by means of a vertical circular flange 6, which is formed on the bottom surface of said top ring, as shown in Fig. 8, said flange being removably secured to the outer upper margin of the casing 1. An outlet or discharge pipe 7, for refuse is attached to the center of the conical bottom 2, with the lower end thereof spaced from the floor to permit a receptacle to be disposed therebeneath for receiving the refuse as it is discharged from the peeler casing. The front of the casing 1, is provided with a large discharge opening which is normally closed by a door 8, connected by means of hinges 9, to the casing. A latch mechanism 10, is secured to the door for holding the same in closed position. The door 8, is of a height which is slightly shorter than the height of the vertical casing walls.

The casing 1, is equipped with an abrasive lining made up of a plurality of curved or arc shaped panels or sections 11, made of an abrasive material. Each abrasive section or panel 11, is provided on the inner surface thereof with a central longitudinal drain groove 12, which extends from the top to the bottom of the section. The abutting sides of each abrasive section 11, are formed with a central longitudinal groove of semi-circular shape, so that the grooves of abutting sections will register with one another when the sections are in place to permit retaining rods 13, to be removably engaged therein for removably holding the abrasive sections secured in position around the interior of the casing. This arrangement permits independent removal of any of the abrasive sections when damaged or worn, and does not necessitate the complete removal of the abrasive lining or the replacement of the casing by a new abrasively lined casing.

A motor 14, is supported by a hanging bracket 15, secured on the bottom and to one side of the conical base 2. The motor shaft 16, is vertical and projects upwardly through a bearing 17, into the lower portion of the casing 1, as clearly shown in Fig. 6. The lower end of the bearing 17, is provided with a recess for holding a packing 18, engaged around the motor shaft 16. The packing 18, is held in position by a passaged retaining plug 19, which is removably threaded into the bearing 17, to afford a non-leaking joint with the motor shaft. A small driving gear or pinion 20, is secured upon the upper end of the motor shaft 16, and meshes with a large gear 21, keyed upon a short vertical stub shaft 22. The stub shaft 22 is rotatably mounted in a spider 23, the legs of which are rigidly secured to the inner surface of the conical casing bottom 2. The lower end of the stub shaft 22, is spaced from the lowermost middle portion of the casing bottom 2, to permit escape of the refuse from the casing through the discharge pipe 7. Integrally formed on the upper end of the stub shaft 22, is an attaching or supporting plate 24, inclined at an angle with respect to the horizontal large gear 21. Rigidly secured upon the top of the inclined supporting plate 24, by rivets or other suitable means, is a large circular inclined base plate 25, the margin of which is bent upwardly to afford a flange 26. Rigidly secured upon the large base plate 25, by cement or glue, is a main or primary inclined abrasive plate or disk 27, the diameter of which is slightly less than the inner diameter of the casing lining.

The inclined members 27, 25 and 24, and the stub shaft 22, are all centrally passaged to afford a vertical pocket for removably receiving the lower end of a vertical auxiliary driving shaft 28 adapted when in position to be rotated by the lower inclined abrasive disk mechanism. For this purpose the lower end of shaft 28 may be frictionally held in the stub shaft 22 or splined therein if desirable. A secondary or auxiliary inclined upper abrasive disk 29, is secured on the upper end of the vertical auxiliary shaft 28, at about the middle portion of the casing 1. The upper disk 29 and the supporting shaft 28, thereof are adapted to be removed through the top of the casing.

The operation is as follows:

The peeling machine is capable of peeling one or more charges of vegetables or fruits at the same time. When only one charge of vegetables such as potatoes is to be peeled, the upper disk 29 and its shaft 28, are removed from the machine. The potatoes are then placed in the machine and are supported upon the lower abrasive disk 27. The motor 14, is then started, and water is admitted into the top of the casing by any suitable kind of a hose or spray, to wash the contents of the machine. The motor rotates the pinion 20, and the large gear 21, which acts to rotate the abrasive disk 27. The rotating disk serves to throw the potatoes supported thereon, centrifugally against the abrading sections 11, while the disk 27, being of abrading material also acts to cut the skin from the potatoes, and furthermore acts to keep the potatoes turning to constantly present a different portion of the potatoes to the abrading surfaces. The stationary abrading lining and the revolving abrading disk co-act to cut or scrape away the skin of the potatoes, while the water sprayed into the casing thoroughly washes the same and flows with the abraded material together with all dirt and refuse, from the upper portion of the machine down through the drain grooves 12, and out of the casing through the discharge pipe 7 into any suitable type of receptacle or drain gutter.

When the operation has continued sufficiently, the door 8, may be opened either with or without stopping the machine. If the machine is still in operation, the cleaned or peeled potatoes are discharged centrifugally through the open door into a receiving receptacle. If the machine is stopped the peeled potatoes roll out of the open door from the inclined abrading disk 27. The inclined position of the disk 27, facilitates rotation and turning of the potatoes in the machine and tends to peel the potatoes much more rapidly than when said disk is horizontal.

The quantity of potatoes in the machine is of course limited and a single charge should reach to a point about one-third the height of the casing 1. To permit a larger quantity or a second charge of potatoes to be peeled with a single operation of the machine, the upper abrading disk 29, is placed in position after the lower charge of potatoes has been placed upon the lower disk 27. The supporting shaft 28, is adapted to engage or seat in the pocket formed in the lower abrading disk mechanism so that the upper inclined disk is adapted to be simultaneously rotated with the lower abrading disk mechanism. An upper or second charge of potatoes is then placed in the machine above the upper disk 29. The machine may then be started and both charges of potatoes peeled and washed at the same time. When the potatoes are sufficiently cleaned the front door may be opened and both the upper and lower charges of peeled potatoes are discharged at the same time. The machine may first be stopped before opening the door, in which case the peeled potatoes roll off of the inclined abrading disks and out of the open door.

One of the important features of the invention is the construction of a peeling machine casing provided with a removable abrasive lining made up of a plurality of independently removable panels or sections to permit ready replacement of any of the sections should they become damaged or worn.

I am aware that numerous details of construction may be varied through a wide range without departing from the principles of my invention, and I therefore do not purpose limiting the patent granted otherwise than necessitated by the prior art.

I claim as my invention:

1. In a vegetable peeling machine, a container, an abrasive disk having a hub rotatably mounted in the lower part of said container, said hub having an aperture, a second abrasive disk above the first disk and having a shaft removably secured in said aperture, and means for rotating said first disk.

2. In a peeling machine a casing member having a grooved abrasive lining, a spider mounted in the bottom of said casing, an inclined abrasive disk having a hollow stub shaft rotatably mounted in said spider, a second inclined abrasive disk having a shaft removably seated in said hollow stub shaft, a gear secured to said stub shaft, and means supported by the bottom of the casing for driving said gear.

3. In a peeling machine, a casing having a bottom, a spider mounted in the bottom, a hollow stub shaft having an upper flange rotatably mounted in said spider, an inclined abrasive disk secured to the flange of said stub shaft, a second inclined abrasive disk spaced from the first disk and having a shaft removably seated in said stub shaft, whereby two peeling compartments are formed, and a door in said casing opposite both compartments.

In testimony whereof I have hereunto subscribed my name in the presence of two subscribing witnesses.

FRANK M. SCHAEFER.

Witnesses:
　EARL M. HARDINE,
　CHARLES W. HILLS, Jr.